United States Patent
Yu

(10) Patent No.: US 6,744,495 B2
(45) Date of Patent: Jun. 1, 2004

(54) WDM MEASUREMENT SYSTEM

(75) Inventor: Tao Chuan Yu, Santa Clara, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/226,928

(22) Filed: Aug. 22, 2002

(65) Prior Publication Data

US 2004/0036857 A1 Feb. 26, 2004

(51) Int. Cl.[7] .............................................. G01N 21/00
(52) U.S. Cl. ...................................................... 356/73.1
(58) Field of Search ............................ 356/73.1, 345, 356/349; 385/11, 15, 24, 31–39, 73, 74

(56) References Cited

U.S. PATENT DOCUMENTS 5,864,400 A * 1/1999 Bottazzi et al. ............. 356/451

2002/0163646 A1 * 11/2002 Anderson .................... 356/477
2002/0191415 A1 * 12/2002 Takei et al. .................. 362/551

* cited by examiner

Primary Examiner—Tu T. Nguyen
(74) Attorney, Agent, or Firm—Wei Te Chung

(57) ABSTRACT

A WDM measuremement system (1) includes a tunable laser (10) for providing light to a WDM (30), a power meter module (110) for detecting optical energy from the WDM, an RL module (120) for measuring return loss of the WDM, a polarization controller (20) connected to the tunable laser for controlling a polarization state of the light from the tunable laser, and a PC device having control software. The tunable laser, the RL module, the power meter module and the polarization controller connect to the PC device using a GPIB cable.

7 Claims, 2 Drawing Sheets

WDM MEASUREMENT SYSTEM

BACKGROUND OF TV INVENTION

1. Field of the Invention

The present invention relates to a wavelength division multiplexer (WDM) measurement system for measuring the optical performance characteristics of a WDM, and particularly to an automatic WDM measurement system with high testing speed and automatic data collection and a flexible testing procedure.

2. Description of Related Art

The public's increasing demand for bandwidth has contributed to an acceleration in the development of WDM technology. Using WDM, data can be transmitted at a high rate on each of several wavelengths of light sharing one optical fiber. To assure that optical characteristics of a WDM meet specifications, WDM testing is necessary.

Present WDM testing usually takes a lot of work and time. For manual testing, the operator has to follow a series of steps, repeatedly tuning laser wavelength settings, and reading power meter data. Furthermore, present WDM testing procedures generally uses a same light path to test Insertion Loss (IL), Polarization Dependent Loss (PDL) and Return Loss (RL), which requires use of an optical coupler to couple part of the optical energy for testing RL. Because an optical coupler has PDL itself, this affects the precision of a test for PDL of a WDM.

It is thus desirable to provide a WDM measurement system which overcomes the above problems.

SUMMARY OF THE INVENTION

An object of the present invention is to provide an automatic WDM measurement system which has a high testing speed, automatic data collection, and which allows a flexible testing procedure.

This invention is an automatic WDM measurement system, which combines presently available testing equipment with a PC device and new software, the combination being capable of mostly replacing manual testing with high testing speed, automatic data collection, and a flexible testing procedure.

The WDM measurement system comprises a tunable laser, a power meter module, an RL module, a polarization controller and a PC device. The tunable laser, the power meter module, the RL module and the polarization controller connect with the PC device through a GPIB cable. The PC device has control software for controlling the WDM measurement process.

Light coming from the tunable laser passes through the polarization controller, the polarization state of the light is changed, then the light is transmitted to a port of a WDM. The power meter module connects with output port of the WDM for measuring output light. The RL module is used in measuring return loss of the WDM after measurement of insertion loss and PDL is accomplished. Return loss testing uses a separate light path connecting the WDM with the RL module.

Other objects, advantages, and novel features of the present invention will become more apparent from the following detailed description when taken in conjunction with the accompanying drawings.

DETAILED DESCRIPTION OF THE INVENTION

Figure 1:
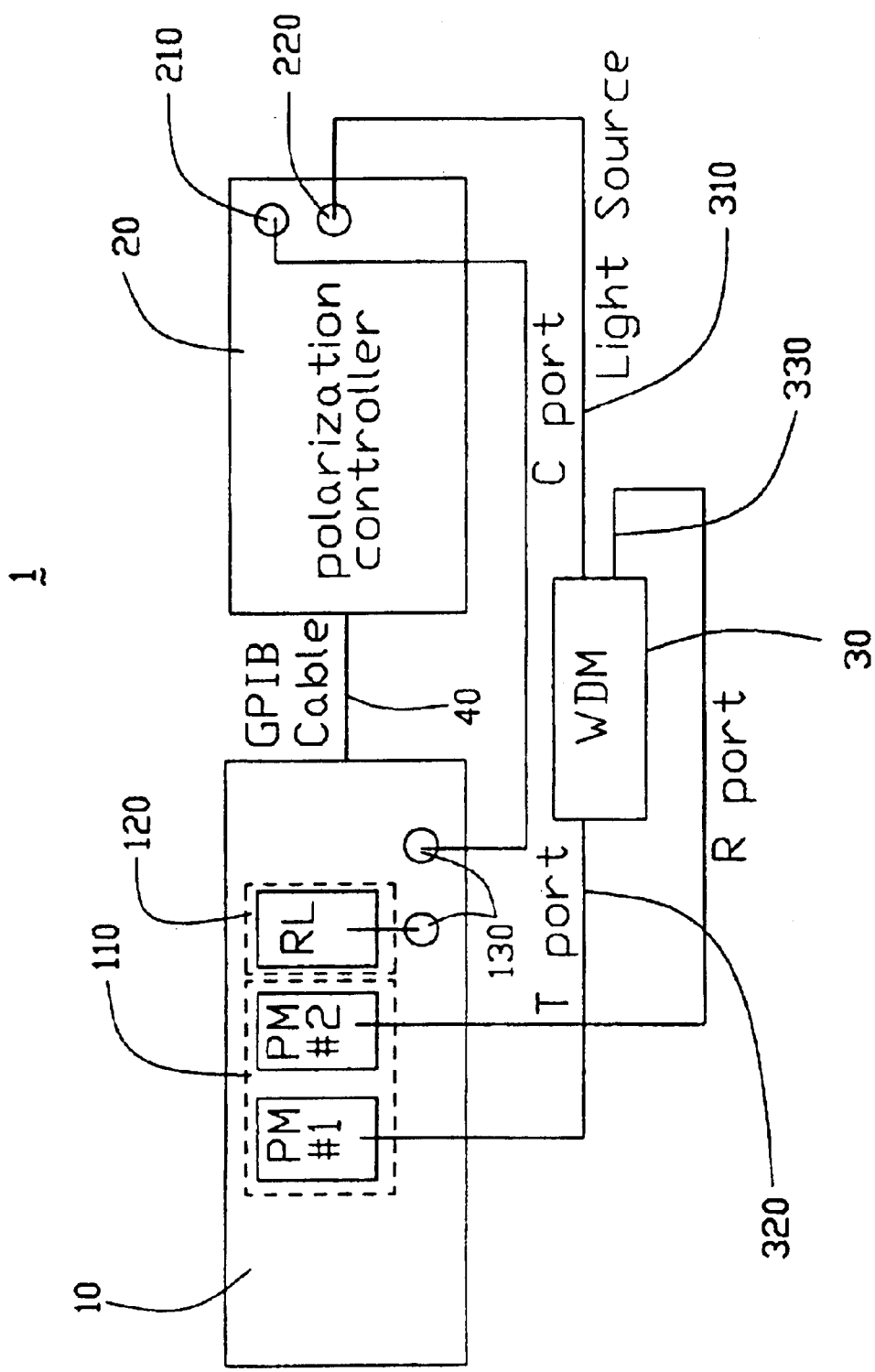
FIG. 1 is a schematic diagram of a WDM measurement system in accordance with the present invention.

Referring to FIG. 1, a WDM measurement system 1 comprises a tunable laser 10, a power meter module 110, an RL module 120, a polarization controller 20 and a PC device (not shown). The tunable laser 10 has a main frame (not labeled) and two output ports 130. The power meter module 110 and the RL module 120 are arranged in the main frame (not labeled). One output port 130 of the tunable laser 10 connects with the RL module 120. The second output port 130 of the tunable laser 10 connects with one port 210 of the polarization controller 20. The tunable laser 10, the power meter module 110, the RL module 120 and the polarization controller 20 connect with the PC device using a GPIB cable 40. The PC device has control software for controlling the wavelength division multiplexer (WDM) measurement process.

When measuring Insertion Loss (IL) and Polarization Dependent Loss (PDL) of a WDM 30, light coming from the second output port 130 of the tunable laser 10 passes through the polarization controller 20, the polarization state of the light is changed, then the light is transmitted from a second port 220 of the polarization controller 20 to a port (C port) 310 of the WDM 30. The power meter module 110 connects with ports (T port, R port) 320, 330 of the WDM 30 for measuring the light coming from the ports 320, 330. The RL module 120 is used to measure return loss of the WDM 30 after accomplishing the measurement of IL and PDL; that is, the RL module 120 connects with C port of the WDM and detects the reflection light to measure RL and Dir of the WDM.

Figure 2:
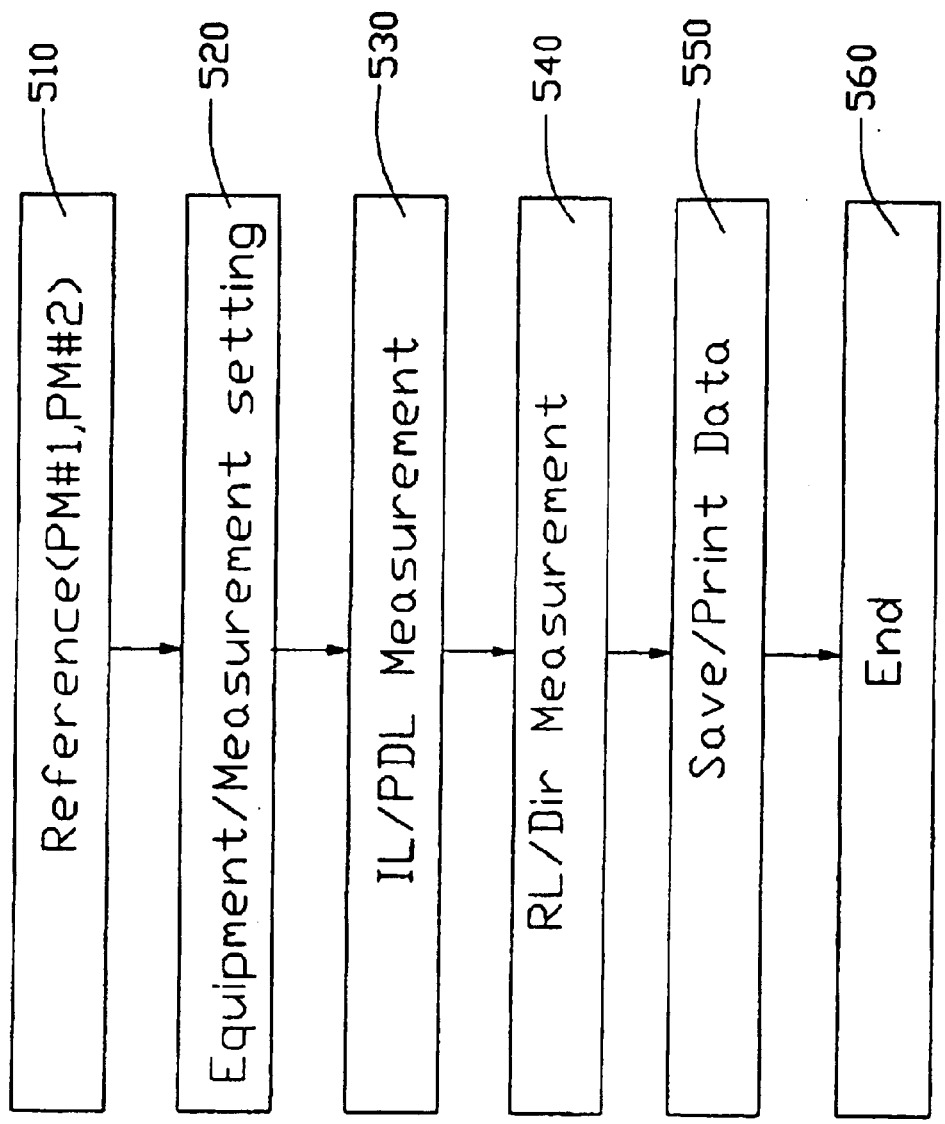
FIG. 2 shows a flow chart of a testing procedure for measuring optical performance of a WDM using the WDM measurement system of the present invention.

FIG. 2 is a flow chart showing a testing procedure for measuring the optical performance characteristics of the WDM 30, comprising the steps of:

Step 510: Adjusting reference points of the power meter module 110;

Step 520: Connecting equipment as shown in FIG. 1, and setting measurement settings;

Step 530: IL/PDL measurement measuring the light intensity at the ports 320, 330 using the power meter module 110, obtaining the value of the light intensity entering the WDM 30 from the port 310 by the reference points set in step 510, testing the IL of the WDM 30 at all testing points, which includes using different polarization states of the light coming from the polarization controller 20, and subtracting a maximum value of IL from a minimum value of IL, to yield PDL.

Step 540: RL/Dir measurement: after accomplishing IL/PDL measurement, disconnecting the polarization controller 20 and the port 310 of the WDM 30, then connecting the RL module 120 to the port 310 of the WDM 30 using a separate light path (not shown) to measure RL of the WDM 30, measuring the light intensity of the ports 320, 330 using the power meter module 110, and measuring the directivity (Dir) of the WDM 30 is performed;

Step 550; Saving and printing data;

Step 560: End of the testing procedure.

If IL of the WMD 30 needs to be tested at different temperatures, the temperature of the WDM 30 is changed and Step 520, 530 plus 530 are performed at each different temperature.

The WDM measurement system 1 of the present invention uses a separate light path connecting the RL module 120 with the WDM 30 to measure RL of the WDM 30 because it is convenient and more accurate. The WDM measurement system 1 can replace manual testing and provide a higher testing speed, automatic data collection, and a flexible testing procedure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A WDM (wavelength division multiplexer) measurement system comprising:
    a tunable laser for providing light to a WDM;
    a polarization controller connecting to the tunable laser for controlling a polarization state of the light coming from the tunable laser;
    a power meter module for detecting light energy coming from the WDM;
    an RL (Return Loss) module for use in measuring return loss of the WDM; and
    a computation and control device connecting with the tunable laser, the RL module, the power meter module and the polarization controller, the device having a control software for controlling the WDM measurement process;
    wherein when an input port of the WDM connects with the polarization controller, IL (Insertion Loss) and PDL (Polarization Dependent Loss) of the WDM are measured, and when the input port of the WDM connects with the RL module, RL and DIR (Directivity) of the WDM are measured.

2. The WDM measurement system as claimed in claim 1, wherein a separate light path connects the RL module with the WDM after insertion loss testing and before return loss testing.

3. The WDM measurement system as claimed in claimed 2, wherein return loss testing is done using the separate light path, and said return loss testing is done after finishing insertion loss testing.

4. The WDM measurement system as claimed in claim 2, wherein the computation and control device is connected with the tunable laser, the RL module, the power meter and the polarization controller via a GPIB (General Purpose Interface Bus) cable.

5. The WDM measurement system as claimed in claim 4, wherein the tunable laser includes a main frame, and the RL module and the power meter module are arranged in the main frame.

6. A method of measuring a WDM (wavelength division multiplexer), comprising the sequential steps of:
    providing a light source from a tunable laser and a polarization controller;
    sending signals from said source to an incoming port of said WDM;
    measuring IL (insertion loss) and PDL (polarization dependent loss) from a transmission port of said WDM; and
    measuring RL (return loss) and DIR (directivity) from a reflection port of said WDM.

7. A system for measuring a WDM, comprising:
    a tunable laser;
    a polarization controller connecting to the tunable laser;
    a WDM (wavelength division multiplexer);
    two power meter modules respectively connecting to a transmission port and a reflection port of said WDM; and
    an RL (return loss) module;
    wherein, the WDM connects to an output of said controller via an incoming port thereof, (Insert Loss) and PDL (Polarization Dependent Loss) of the WDM are measured, and when the WDM connects to an output of said RL module via the incoming port thereof, RL and DIR (Directivity) of the WDM are measured.

* * * * *